United States Patent [19]

Ruehl et al.

[11] Patent Number: 4,592,117
[45] Date of Patent: Jun. 3, 1986

[54] DROP WIRE CLAMP

[76] Inventors: William E. Ruehl, 315 Surrey Rd., Wheeling, Ill. 60090; John N. Schavilje, 812 S. See-Gwun, Mt. Prospect, Ill. 60056; Edwin G. Swick, 28W629 Stearns Rd., Bartlett, Ill. 60103

[21] Appl. No.: 700,142

[22] Filed: Feb. 11, 1985

[51] Int. Cl.$^4$ .......................... F16B 2/02; F16G 11/00
[52] U.S. Cl. ................... 24/136 R; 24/129 R; 24/132 WL; 403/371; 403/391
[58] Field of Search ......... 24/136 R, 136 L, 132 WL, 24/132 R, 129 R, 115 R, 115 M; 403/371, 374, 391, 213

[56] References Cited

U.S. PATENT DOCUMENTS

| | | | |
|---|---|---|---|
| 482,975 | 9/1892 | Cope | 24/136 R |
| 824,556 | 6/1906 | Lowry et al. | 24/136 R |
| 1,504,087 | 8/1924 | Brady | 24/136 R |
| 1,647,398 | 11/1927 | Draheim et al. | 24/115 M |
| 2,781,212 | 2/1957 | Jugle | 403/213 |
| 2,894,056 | 7/1959 | Bogese | 403/391 |
| 3,071,831 | 1/1963 | Chickvary et al. | 403/371 |
| 3,235,944 | 2/1966 | Broske et al. | 29/526 |
| 3,349,167 | 10/1967 | Mixon, Jr. et al. | 403/391 |
| 3,629,909 | 12/1971 | Riley | 403/371 |
| 3,676,900 | 7/1972 | DeValenzuela | 403/374 |
| 3,896,527 | 7/1975 | Miller et al. | 24/132 R |
| 4,142,294 | 3/1979 | Adair | 24/129 R |
| 4,236,281 | 12/1980 | Bottum | 24/132 R |
| 4,430,523 | 2/1984 | Hayes | 24/136 R |
| 4,461,059 | 7/1984 | Bury | 403/213 |
| 4,493,134 | 1/1985 | Karr | 24/132 WL |

Primary Examiner—Victor N. Sakran

[57] ABSTRACT

A drop wire clamp is provided for suspending a coaxial cable drop wire or the like. The clamp is of molded plastic resin material comprising a body having converging clamping surfaces on the interior thereof, and a two part wedge having external tapered surfaces engageable with the body converging clamping surfaces to wedge the two parts of the wedge together. The two parts of the wedge have confronting surfaces defining a channel for gripping a cable. The channel undulates transversely longitudinally thereof, and a pair of smaller adjacent, parallel channels of similar undulating construction are provided on either side of the first-mentioned channel for gripping a messenger wire. An extension of the body is provided with an eyelet for hanging over a hook or the like.

21 Claims, 9 Drawing Figures

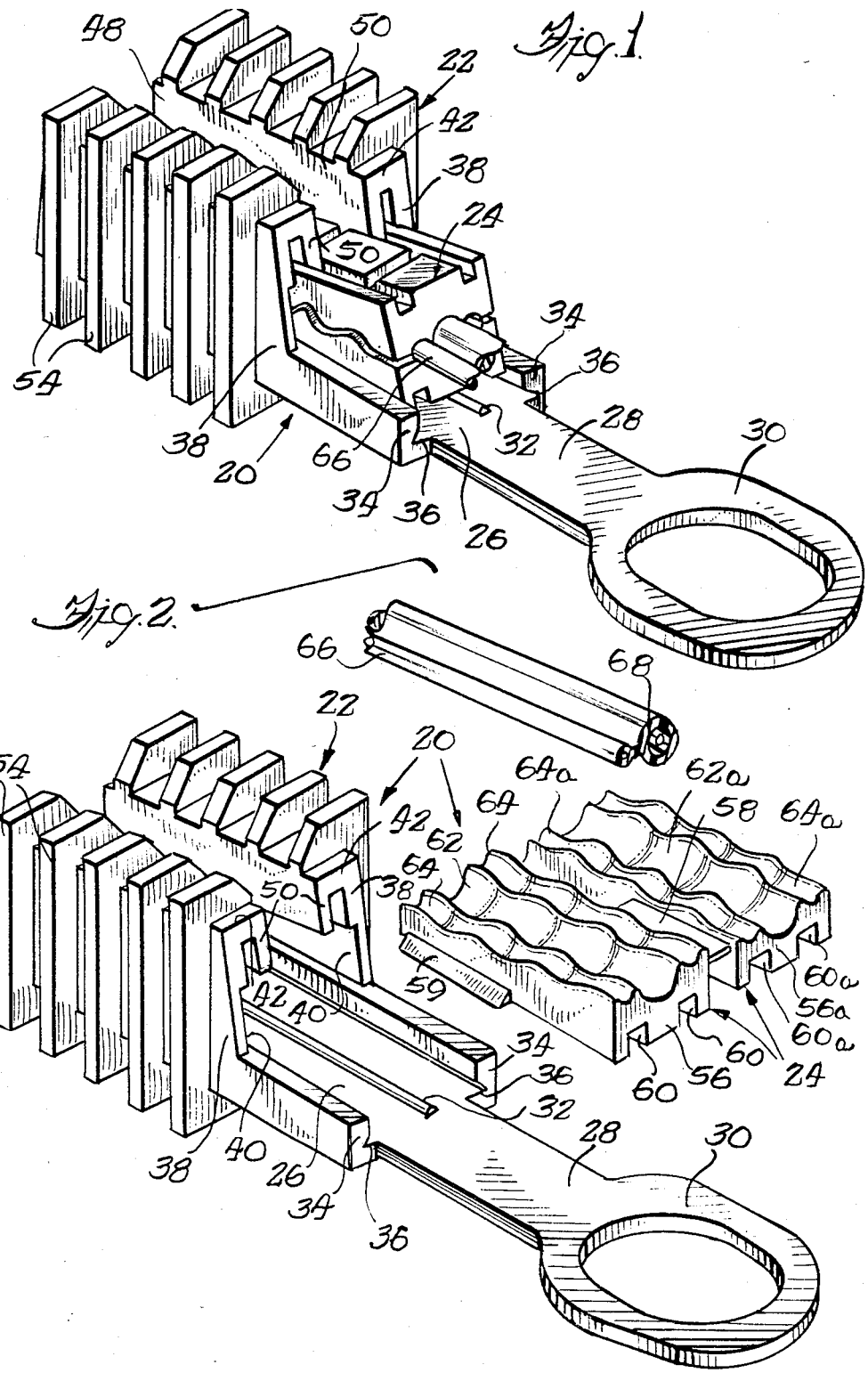

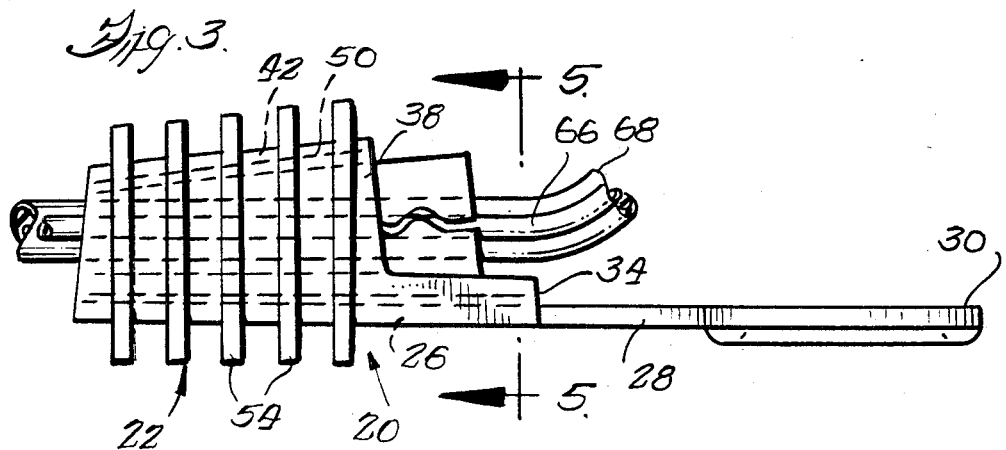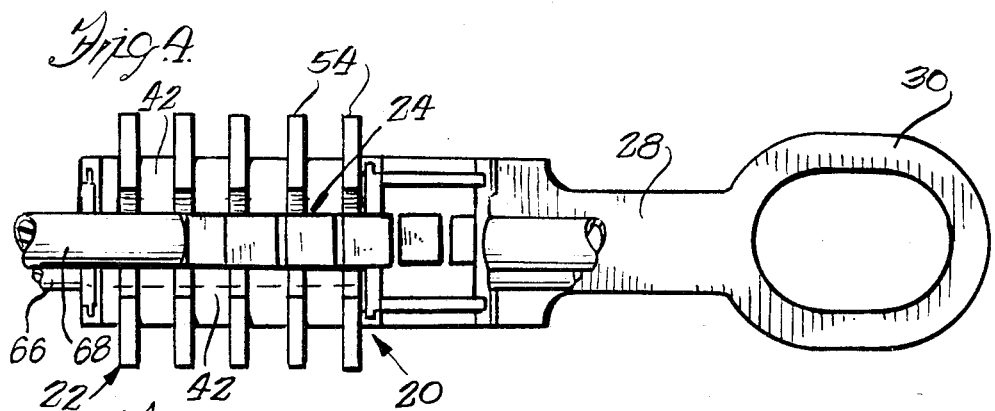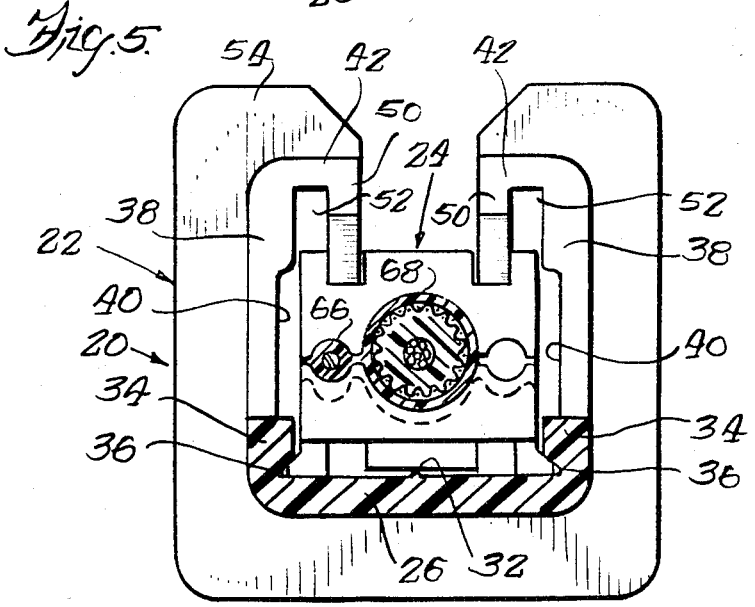

DROP WIRE CLAMP

BACKGROUND OF THE INVENTION

Coaxial cables are widely used in the communications art. For example, in connection with subscription cable television service it is common practice to provide a network of coaxial cables over an extended area to carry the high frequency signal from the receiving station to the many individual decoders and TV receivers. Such a cable network may be carried under ground, but in many instances is an overhead service suspended from utility poles.

It is also common practice for the cable connection from the general network to the individual household, commonly called a drop wire, to be suspended overhead. Some device must be provided for anchoring the cable to the side of the house somewhere adjacent to where it enters the house for connection to the decoder and receiver. It is essential that whatever device is used for suspending the cable not damage either the insulation or the conductors, and it also is essential that the spacing between the core wire and the shielding peripheral braid not appreciably be disturbed. Some coaxial cables have a steel messenger wire molded into a lateral appendage of the insulation. Such messenger wire may be stripped from the insulation and wrapped around a hook or other support. However, this exposes this wire to rust and deterioration.

A wedging clamping device in a drop wire clamp is disclosed in U.S. Pat. No. 3,629,909. A quite different wedging device for a dropwire is disclosed in U.S. Pat. No. 4,461,059.

Wedging clamping devices have been used in cable splicers in the nature of connecting conducting wires or cables together. These devices necessarily have been made of metal to effect the necessary conduction from one cable or wire to another. Patents showing such wedging clamps include Broske et al., U.S. Pat. No. 3,235,944 and Mixon et al., U.S. Pat. No. 3,349,167. Although such clamps were satisfactory for connecting conductors together, they would not be satisfactory for anchoring a coaxial cable since they are not shaped properly for this purpose and since the metal would deform the cable and alter its electrical characteristics.

OBJECTS AND ADVANTAGES OF THE PRESENT INVENTION

It is object of the present invention to provide a wedging type connector made of plastic for gripping a coaxial cable and having an eyelet thereon for engagement with a hook or the like to suspend coaxial cable such as between a utility pole and a building.

It is a further object of the present invention to provide such a wedging type connector having convoluted gripping surfaces providing a far longer area of contact than straight surfaces.

It is further an object of the present invention to provide a wedge type connector for a coaxial cable which also wedgingly grips a messenger wire thereon.

The foregoing and other objects of the present invention are attained by the provision of a two-piece wedging connector. A hinged split wedge is provided in which two wedge portions are interconnected by an integral flexible web. The two portions of the hinged web are provided with convoluted channels therein which, when the wedge portions are folded into engagement grip the coaxial cable. An auxiliary channel grips the messenger wire. The wedge has a tapered external surface which cooperates with a tapered wedging surface in a body. The body is provided with a longitudinal opening to permit lateral assembly with the coaxial cable, whereupon the split wedge grips upon the coaxial cable and tightens on the coaxial cable as the wedge is inserted longitudinally into the body. The body is provided with an extension having an eyelet for hanging on a hook or the like. Tension on the cable pulls the wedge more tightly into the body for more secure gripping. The entire structure is formed of a resilient resinous plastic material which is not damaging to the cable, and which is weather resistant.

THE DRAWINGS

The invention will best be understood with reference to the following specification when taken in connection with the accompanying drawings wherein:

FIG. 1 is a perspective view of a drop wire clamp for coaxial cable constructed in accordance with the principles of the present invention;

FIG. 2 is an exploded perspective view of the parts of the clamp of FIG. 1, including the coaxial cable with messenger wire;

FIG. 3 is a side view of the clamp of FIG. 1;

Figure 6:
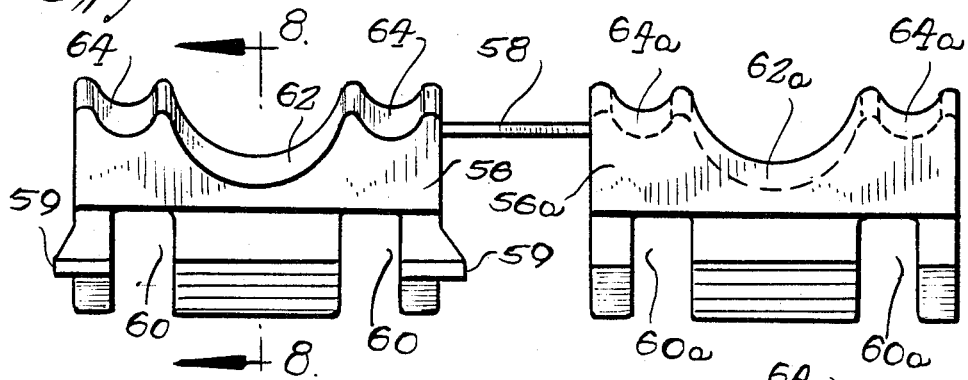
Figure 7:
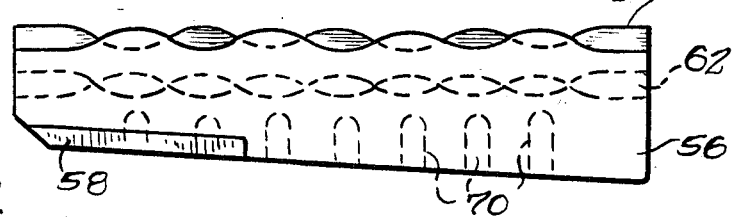
Figure 8:
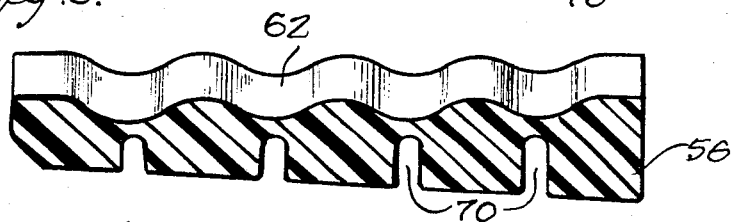
Figure 9:
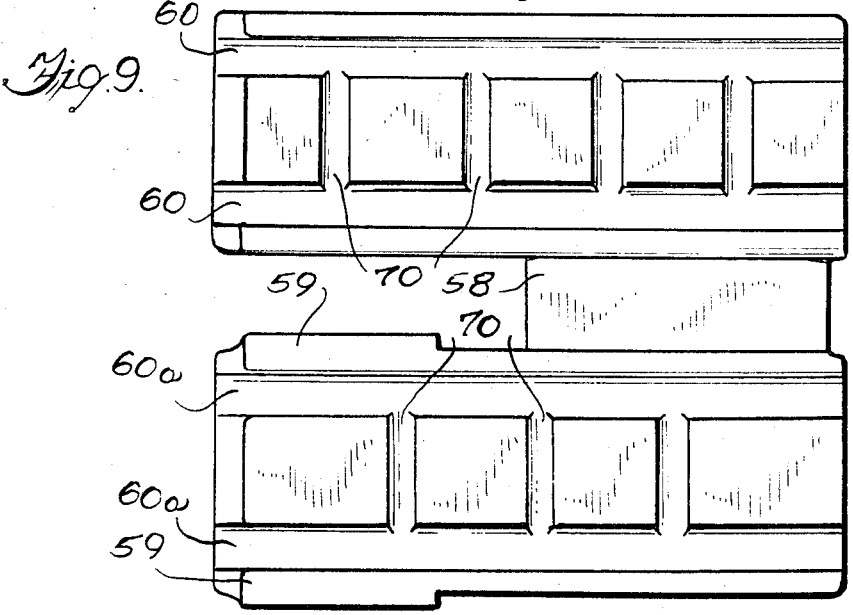

FIG. 4 a top view thereof;

FIG. 5 is an end view partly in cross-section as taken along the line 5—5 in FIG. 3;

FIG. 6 is an end view of the two part wedge forming a part of the clamp;

FIG. 7 is a side view thereof;

FIG. 8 is a longitudinal section view thereof as taken substantially along the line 8—8 in FIG. 6; and FIG. 9 is a bottom view thereof.

DETAILED DESCRIPTION OF THE ILLUSTRATED EMBODIMENT

Turning now in greater particularity to the drawings, and first to FIGS. 1–5 there will be seen a two piece drop cable clamp 20 constructed in accordance with the principles of the present invention. Both parts of the clamp are molded of a suitable plastic resin material of which polypropylene is a preferred example. Specifically, an ultraviolet stabilized black polypropylene is provided. The two parts comprise an outer housing or body 22 and an inner gripping wedge 24. The body 22 is generally channel shaped in configuration and comprises a flat floor 26 having an extension 28 leading to an eyelet 30 for hanging of the clamp over a hook or the like to suspend a cable secured by the clamp. The floor 26 is provided on the upper surface thereof and along the longitudinal center line with a rib 32 having an arcuate upper surface. Rather narrow or stubby sidewalls 34 extend upwardly from the longitudinal edges of the body throughout its length. Tapered dovetails or undercuts are provided on the inner faces of the stub sidewalls 34 at the junction thereof with the floor 26.

About one-third of the way in from the entering end of the body (the right end in FIGS. 1–4) and extending to the far end the body is provided with higher, upstanding sidewalls 38 which are externally coplanar with the stub sidewalls 34. The sidewalls 38 are of maximum height at the entering end and taper down toward the far end, and both the entering end and far end of the sidewalls are tapered so that the sidewalls are slightly shorter at the top than at the bottom. The sidewalls are relieved along their inner faces at 40 to minimize friction with the clamp portion of the connector as will be set forth hereinafter. Inwardly directed, confronting longitudinal flanges 42 are provided at the top edges of the walls 38 and taper downwardly the same as the sidewalls 38 from the entering end to the opposite end. The flanges 42 are spaced apart, forming a longitudinal opening 48 at the top of the body 22. Downwardly directed flanges 50 are provided at the outer ends of the confronting flanges 42, these flanges being spaced from the sidewalls 38 at 52. As will be seen these downwardly turned flanges 50 taper downwardly from the entering end of the sidewalls 38 to the opposite end thereof, just as do the confronting flanges 42.

As will be apparent hereinafter when the clamp or gripping member is associated with a cable and with the body there is a tendency to bend the flanges 50 and 42 upwardly, and to bend the sidewalls 38 outwardly. This is resisted by a plurality of longitudinally spaced, transversely disposed circumferential or peripheral fins or flanges 54. By way of specific illustration there are five such fins or flanges.

The gripping member or clamp 24 comprises two generally similar parts or segments 56 and 56a interconnected by a web or membrane 58 extending therebetween over about half of the length thereof. The segment 56 that becomes the bottom portion of the clamp is provided along its bottom edges over approximately one-half of the entering portion thereof with outwardly directed tapered flanges 59 that interfit with the dovetail slots or undercuts 36 of the body 22. The bottom of the lower segment 56 is provided with longitudinal channels 60 generally adjacent the outer edges thereof, while the upper segment is provided with similar channels 60a.

The segments are provided with longitudinally extending central channels 62 and 62a which come into confronting relation when the upper segment is folded over into confronting relation with the lower segment. The cross section of each of these channels 62 and 62a is somewhat less than semi-circular, and longitudinally the resulting channel is convoluted or undulates from one end to the other. Crests in one channel 62 are opposed by valleys in the opposite channel 62a, and vice-versa. Similar but narrower channels 64 and 64a are provided outboard of the channels 62, 62a for gripping the messenger wire 66 of a coaxial cable 68. Generally there is only a single messenger wire provided, and it can be gripped by either of the opposing outboard channels 64, 64a to avoid the necessity of twisting the cable.

The segments 56 and 56a of the gripping member or clamp are completed by a limited number of transverse grooves 70 in the respective top and bottom surfaces providing a controlled degree of longitudinal flexibility to the clamp. As will be understood the clamp is wedge shaped, being of lesser height at the entering end (the left end in the drawings) than at the opposite end, so that when the two segments of the clamp are brought against a cable 68 and the lateral tapered flanges 59 are inserted in the dovetails 36 the clamp will slide into place with the downturned flanges 50 bearing against the upper surface thereof, whereupon the gripping member wedges tightly into place within the body as it moves from entering end toward the opposite end. The gripping member or wedge does not enter completely into the body, whereby there is a greater flexibility to the wedge, thereby avoiding possible damage to the insulation and conductors of the cable. One of the relieved areas 40 provides clearance for the folded web 58. The rib 32 provides friction to hold the two halves of the wedge preassembled with the body before assembly with a cable.

The two channels for receipt of the messenger wire allows use of a cable with a single messenger wire lying on either side of the main portion of the cable. The clamp is also satisfactory for use with a cable having no messenger wire whatsoever. The flanges at the lower corners of the wedge allow guided insertion of the wedge into the channel portion of the body straight forwardly, avoiding any relative tipping or the misalignment that might render insertion difficult. The undulations in the messenger wire gripping channels as well as in the main channel not only insure gripping over a longer length, but grip more securely in that retractive movement of the cable through the wedge portion of the clamp would have to be along a sinuous or convoluted path, rather than a straight through path.

When the eyelet of the connector is placed over a hook on a pole or building and load is put on the cable, (such as its own weight) the wedge is pulled farther into the body, thus squeezing the cable more tightly and enhancing the gripping thereof.

The series of transverse grooves on the outer surfaces of the wedge permit limiting flexing thereof. If pressure were applied through wedging action over the entire length of the wedge, tremendous force would be required to cause the cable and wire to conform to the undulating or convoluted contour of the channels, requiring stretching of both the cable and the wire. This could cause damage to the insulation and attenuation of the signal being conducted. With the limited flex provided by the transverse grooves, each lobe of the contour of the channel pulls the cable and wire into conformity by drawing it in from the free end of the cable. The circular cross section of the cable gripping channel causes the cable to be clamped and retained in its normal round configuration, even though the path is serpentine or convoluted. Circular deformation of the cable thus is minimized.

The open top of the body allows a cable to be inserted transversely into the body, and obviates the necessity of feeding a cable axially through the connector. The transverse fins or webs on the body prevent deformation and opening up of the open top of the body beyond its intended dimensions. Bulging of the sidewalls of the body under load further is prevented by fitting of the downwardly directed flanges of the body in the corresponding longitudinal channels or grooves of the wedge.

The specific example of the invention as herein shown and described will be understood as being exemplary. Various changes in structure will no doubt occur to those skilled in the art, and will be understood as forming a part of the present invention insofar as they fall within the spirit and scope of the appended claims.

The invention is claimed as follows:

1. A clamp device for securing a cable comprising a body having longitudinally extending inner converging clamping surfaces, and a two-part wedge of molded plastic resin material having longitudinally extending external tapered surfaces engageable with said body inner converging clamping surfaces to wedge the two parts of said wedge together, each of the two parts of said wedge having a continuous longitudinally extending confronting undulating channel of uniform cross section extending from end-to-end where the crests in one channel is opposed by valleys in the opposite channel and vice-versa for clamping a cable therebetween.

2. A clamp device as set forth in claim 1 wherein said channel has a substantially circular cross section for uniform gripping of a cable.

3. A clamp device as set forth in claim 1 herein the transverse dimensions of said body and of said two part wedge are interrelated such that the wedge extends part way out of said body at the entering end thereof.

4. A clamp device as set forth in claim 1 wherein said body has a longitudinal opening along one side thereof for laterally receiving a cable.

5. A clamp device as set forth in claim 1 wherein the two parts of said wedge are interconnected by an integral flexible strip.

6. A clamp device as set forth in claim 1 and further including a second channel substantially parallel to said first-mentioned channel for gripping a messenger wire or the like forming a part of said cable.

7. A clamp device as set forth in claim 6 wherein said second channel also undulates longitudinally thereof.

8. A clamp device as set forth in claim 6 and further including a third channel, said second and third channels lying on relatively opposite sides of said first-mentioned channel.

9. A clamp device as set forth in claim 8 wherein said second and third channels also undulate longitudinally thereof.

10. A clamp device as set forth in claim 6 wherein said first mentioned channel has a predetermined transverse diameter, and wherein the second channel has a smaller transverse diameter.

11. A clamp device as set forth in claim 10 wherein said second channel undulates longitudinally thereof.

12. A clamp device as set forth in claim 10 and further including a third channel said third channel being of the same transverse diameter as the second channel, said second and third channels lying on opposite sides of said first-mentioned channel.

13. A clamp device set forth in claim 12 wherein said second and third channels undulate longitudinally thereof.

14. A clamp device as set forth in claim 1 and further including means providing an eyelet on said body for hanging of said clamp device over a hook or the like.

15. A clamp device as set forth in claim 1 wherein said body is substantially channel-shaped having a substantially flat floor, a pair of spaced substantially parallel side walls upstanding from said floor to respective upper edges, and inwardly directed confronting flanges extending toward one another from said respective upper edges of said sidewalls and terminating in spaced relation.

16. A clamp device as set forth in claim 15 and further including a longitudinal recess in each sidewall adjacent said floor, and complementary flanges on said wedge received in said recesses.

17. A clamp device as set forth in claim 15 and further including a plurality of transverse circumferential flanges on said body spaced longitudinally thereof for bracing of said body.

18. A clamp device as set forth in claim 1 and further including a plurality of edge-opening transverse grooves therein imparting controlled longitudinal flexibility to said wedge.

19. A clamp device for securing a cable comprising a substantially channel-shaped body having inner converging clamping surfaces and having a substantially flat floor, a pair of spaced substantially parallel side walls upstanding from said floor to respective upper edges, and inwardly directed confronting flanges extending toward one another from said respective upper edges of said sidewalls and terminating in spaced relation, a two-part wedge of molded plastic resin material having external tapered surfaces engageable with said body inner converging clamping surfaces to wedge the two parts of said wedge together, the two parts of said wedge having confronting surfaces defining a channel therebetween for clamping a cable therein, said channel undulating transversely longitudinally thereof, and additional flanges on said first-mentioned flanges projecting toward said floor and at least in part providing said converging clamping surfaces with said floor, and complementary channels in said wedge receiving said additional flanges.

20. A clamp device as set forth in claim 19 and further including a plurality of transverse circumferential flanges on said body spaced longitudinally thereof for bracing of said body.

21. A clamp device as set forth in claim 19 and further including a plurality of edge-opening transverse grooves therein imparting controlled longitudinal flexibility to said wedge.

* * * * *